United States Patent [19]

Oogita et al.

[11] Patent Number: 4,882,477
[45] Date of Patent: Nov. 21, 1989

[54] CARD-SHAPED ELECTRONIC APPARATUS WITH EMBOSSED SURFACE AND METHOD OF PRODUCING SAME

[75] Inventors: Yoshinori Oogita; Katsuhide Shino, both of Nara, Japan

[73] Assignee: Sharp Kabushiki Kaisha, Osaka, Japan

[21] Appl. No.: 262,968

[22] Filed: Oct. 26, 1988

Related U.S. Application Data

[63] Continuation of Ser. No. 171,968, Mar. 23, 1988, abandoned.

[30] Foreign Application Priority Data

Mar. 24, 1987 [JP] Japan .............................. 62-44672[U]

[51] Int. Cl.⁴ ............................................ G06K 19/02
[52] U.S. Cl. ..................................... 235/488; 235/487
[58] Field of Search ................................ 235/487, 488

[56]  References Cited

U.S. PATENT DOCUMENTS 4,213,041  7/1980  Smith .................................. 235/488

Primary Examiner—Harold I. Pitts
Attorney, Agent, or Firm—Flehr, Hohbach, Test, Albritton & Herbert

[57]  ABSTRACT

A card-shaped electronic apparatus has a film member pasted on the surface of a planar circuit piece. The film member has protrusions formed thereon and a filler is injected behind these protrusions between the film member and the circuit piece.

8 Claims, 1 Drawing Sheet

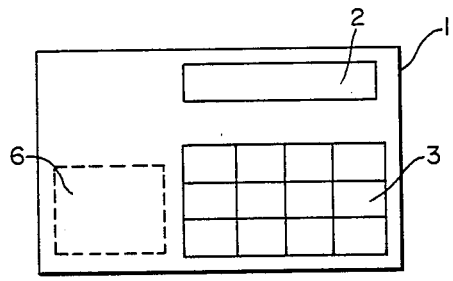
FIG.—1
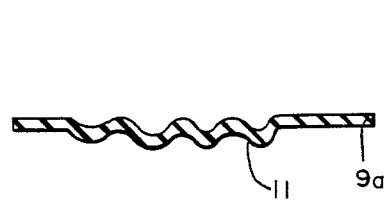
FIG.—4A
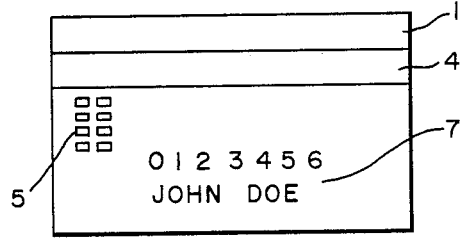
FIG.—2
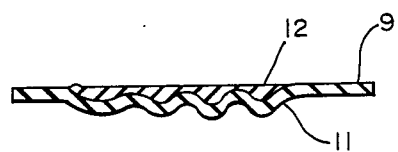
FIG.—4B
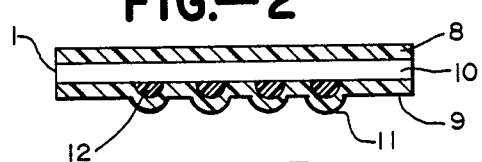
FIG.—3
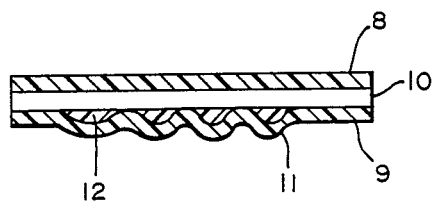
FIG.—4C
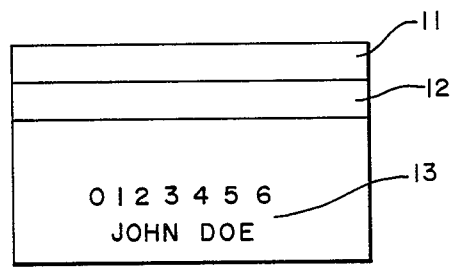
(PRIOR ART)
FIG.—5
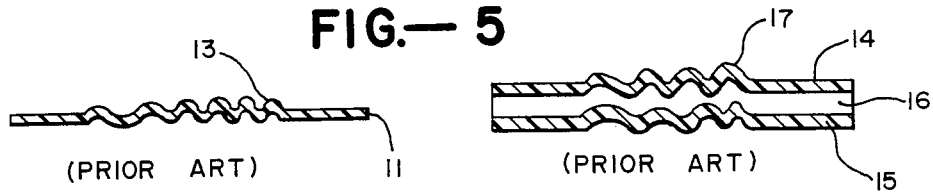
(PRIOR ART)
FIG.—6
(PRIOR ART)
FIG.—7

CARD-SHAPED ELECTRONIC APPARATUS WITH EMBOSSED SURFACE AND METHOD OF PRODUCING SAME

This is a continuation of application Ser. No. 171,968 filed Mar. 23, 1988, now abandoned.

BACKGROUND OF THE INVENTION

This invention relates to a card-shaped electronic apparatus with an embossed surface and more particularly to such apparatus containing electronic components and having surface protrusions processed so as not to be easily crushed.

There are currently in use many types of card-shaped electronic apparatus such as credit cards having an embossed surface such that the cardholder's name, code, etc. can be clearly ascertained. Such a card may typically look as shown in FIG. 5 with a magnetic tape 12 attached to a main body 11 with embossed sections 13 describing the holder's name and code. FIG. 6 shows schematically a sectional view of such a card 11 with protrusions in the embossed section 13. Such protrusions are created by means of an instrument referred to as an embosser.

As another example of card-shaped electronic apparatus, FIG. 7 shows the structure of a conventional magnetic card 17 with a core of a vinyl chloride resin material with thickness of about 0.5 mm sandwiched from both sides with coating films with thickness of about 0.1 mm such that its total thickness is about 0.76 mm. Protrusions produced by an embossing operation are usually present all over the card surface. IC cards are expected to be the cards of the next generation. In the case of IC cards with display means, however, a liquid crystal display, a battery, a printed wiring board, LSI circuits, peripheral components, etc. are formed all over the card area and such a card cannot be subjected to an embossing process of the usual kind with an embosser by which protrusions are generally formed on conventional card-shaped electronic apparatus.

SUMMARY OF THE INVENTION

It is therefore an object of the present invention to provide an improved card-shaped electronic apparatus such as an IC card with an embossed surface and a method of producing such a card.

A card-shaped electronic apparatus embodying the present invention is characterized not only as having protrusions on the surface created by an embossing process but also as having a filler material injected inside these protrusions. With an apparatus to be thus structured, an embossing process can be carried out without much trouble without damaging its internal circuit structures and the protrusions thus formed are not crushed easily.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a plan view of the front surface of a card-shaped electronic apparatus embodying the present invention, FIG. 2 is a plan view of the back surface of the apparatus of FIG. 1, FIG. 3 is a schematic sectional view of the apparatus of FIGS. 1 and 2, FIGS. 4A–4C are schematic sectional views showing the stages of production process of the apparatus of FIGS. 1–3, FIG. 5 is a plan view of a prior art card-shaped electronic apparatus, FIG. 6 is a sectional view of the apparatus of FIG. 5, and FIG. 7 is a sectional view of a prior art magnetic card.

DETAILED DESCRIPTION OF THE INVENTION

The present invention is described by way of an IC card shown in FIGS. 1–3 as an example of card-shaped electronic apparatus embodying the present invention. The IC card 1 is provided with a display device 2 and a key input section 3 on the front surface. A magnetic tape 4 is attached to its back surface which is also provided with contact pins 5. Numeral 6 indicates a battery which is contained internally. The entire card area is occupied by a circuit unit (not shown). Numeral 7 indicates a portion of the back surface where the card holder's code and name are marked by an embossing process and hence the card surface has protrusions.

Sectionally, the card 1 is structured as shown in FIG. 3 with an upper surface covering member 8 and a lower surface covering member 9 sandwiching therebetween a circuit unit layer 10 which includes not only the battery 6 but also a liquid crystal display, a printed wiring board, an LSI circuit and so forth (not individually shown). It is clear that the entirety of the card 1 thus structured cannot be subjected to an embossing process of the conventional type. Thus, as shown in FIG. 3, it is only the film material which forms the lower surface covering member 9 that is subjected to an embossing process. In other words, downward protrusions describing the cardholder's code and name are formed only on this film material and after a filler material 12 is injected into the space created inside these protrusions, the film material is pasted onto the main body of the card 1.

FIGS. 4A–4B illustrate schematically the process outlined above. As a first step, a film material 9a for forming the lower surface covering member 9 is subjected to an embossing process with an embosser and a plurality of protrusions 11 are formed as shown schematically in FIG. 4A. Next, a filler 12 is injected into the interior of these protrusions 11 from the opposite side and hardened therein as shown in FIG. 4B. In other words, it is injected into the indentations formed on the opposite side of the protrusions 11. Thereafter, the lower surface covering member 9 thus formed is pasted onto the combination preliminarily prepared by pasting together the upper surface covering member 8 and the circuit unit 10 as shown in FIG. 4C, thereby completing the production of the IC card with an embossed surface.

In summary, unlike the time-consuming conventional method by screen printing for attaching names and codes on such card-shaped apparatus, the present invention allows embossing processes to be performed easily on a surface of a card-shaped electronic apparatus without damaging its internal circuit elements such as a liquid crystal display, a battery, a printed wiring board, and LSI circuits. Moreover, the filler injected beneath the protrusions make them harder to crush and hence allow them to last longer.

What is claimed is:

1. In a card-shaped electronic apparatus with an embossed surface, the improvement wherein said apparatus comprises a planar circuit piece and a film member on said surface, said film member having protrusions formed thereon, and pasted onto said planar circuit piece, a filler being injected behind said protrusions between said film member and said planar circuit piece.

2. A method of producing a card-shaped electronic apparatus with embossed surface, said method comprising the steps of subjecting lower film material having mutually opposite first and second surfaces to an embossing process to produce a plurality of protruding sections on said first surface and correspondingly indenting sections on said second surface, injecting a filler into said indenting sections of said lower film material and hardening said filler in said indenting sections, preparing a combination by pasting together an upper film and a circuit unit, and pasting together said combination and said lower film material with said filler injected and hardened in said indenting sections.

3. The method of claim 2 wherein said apparatus includes a display section, a key section with input keys, a magnetic tape, and contact pins.

4. The method of claim 2 wherein said lower film material serves as a back surface of said apparatus, said back surface including a code section where a code is embossed and a name section where a name is embossed.

5. The method of claim 2 wherein said circuit unit includes a battery.

6. The method of claim 5 including a liquid crystal display, a printed wiring board and a large scale integrated circuit.

7. The method of claim 1 wherein said embossing process is effected only on said lower film material.

8. The method of claim 1 wherein said embossing processes is effected by using an embosser.

* * * * *